Patented Oct. 20, 1925.

1,558,000

UNITED STATES PATENT OFFICE.

HARRY M. FERNBERGER, OF ASBURY PARK, NEW JERSEY, ASSIGNOR TO GENERAL ELECTRIC COMPANY, A CORPORATION OF NEW YORK.

METHOD OF MAKING TUNGSTEN WIRES.

No Drawing.  Application filed February 10, 1922. Serial No. 535,639.

*To all whom it may concern:*

Be it known that I, HARRY M. FERNBERGER, a citizen of the United States, residing at Asbury Park, county of Monmouth, State of New Jersey, have invented certain new and useful Improvements in Methods of Making Tungsten Wires, of which the following is a specification.

My invention relates to the production of tungsten metal suitable for manufacture into drawn wire, and more particularly to the production from such wire of incandescent lamp filaments which show to a remarkably uniform extent resistance to change of form or sagging when operated at high temperature, as in gas filled lamps, and also to off setting, by which I mean a lateral shifting of one section of the filament with respect to an adjacent section.

The object of my invention is to produce tungsten metal which may be worked by the usual methods into drawn wire from which can be obtained filaments which exhibit to a very marked and uniform extent the ability to retain their original properties and to resist sagging and off setting even when operated at high temperature in a gas filled lamp during a normal or commercially useful life of the lamp.

In accordance with my invention the properties of tungsten are modified or influenced by means of an alkali metal preferably potassium, which is associated with the tungsten at such a stage in the process of its preparation and in such a way that the tungsten may be wrought and drawn in the usual way into wire from which may be obtained filaments more uniform and better than those from wire made from tungsten prepared in the usual way.

By my invention the alkali metal is caused to exert a marked and favorable influence on the tungsten and appears to be in much more intimate and uniform association with it than can be obtained by methods heretofore known. The method which I prefer to use to cause the potassium to exert the desired influence on the tungsten is to make a water solution which contains tungsten and either ammonium or sodium, and an alkali metal which is preferably more electropositive than sodium, such as potassium rubidium or cæsium, and to obtain from this solution crystals which have a distinctive appearance and appear to be a double salt of tungsten containing potassium or its equivalent. From the metal obtained by using these crystals I may make wire which exhibits a more uniform resistance to sagging and off setting than wire obtained from tungstic oxide prepared in the usual manner.

I prefer to bring the tungsten into solution in the form of ammonium tungstate which may be prepared by dissolving crude or commercial tungstic oxide in aqua-ammonia prepared by mixing about one part of concentrated ammonium hydroxide with five parts of water. The crude tungstic oxide is slowly added to the aqua-ammonia and agitated until all the yellow color of the tungstic oxide has disappeared.

In order to bring the akali metal, such as potassium or its equivalents, such as rubidium or cæsium, into proper association with the tungsten, I now add to this solution of ammonium tungstate a solution containing the alkali metal, as for example a solution containing hydrated potassium carbonate sufficient in amount to equal from 5% to 20% by weight of the crude tungstic oxide. The solutions are stirred, filtered, and the filtrate evaporated on a steam bath until crystallization occurs. The crystals are collected on a suction filter, washed with aqua-ammonia and then with cold water, and dried on a steam bath.

The crystals obtained by the method described above contain tungsten, ammonium, and potassium, and appear to be a double alkali metal salt of tungsten, probably potassium ammonium para tungstate. The crystals are white, with a pearly lustre, and resemble napthalene in appearance. They are very different in appearance from the coarsely crystalline plate like crystals which may be obtained by evaporation of some of the ammonium tungstate solution before the potassium carbonate solution has been added to it. By slow evaporation at temperatures lower than those employed in evaporation on a steam bath, the crystals of potassium ammonium para tungstate may be obtained in the form of needles rather than plates. Apparently the potassium and the ammonium are in chemical combination with the tungsten as the crystals differ decidedly in appearance from crystals of ammonium para tungstate and the potassium is so firmly bound in some way that it cannot all be removed by an acid treatment of the crystals. By this crystallization I cause the potassium to be intimately associated with the tungsten in some way which imparts to the tungsten metal produced from these crystals desirable characteristics which can be obtained in no other way.

The potassium ammonium para tungstate crystals obtained as above described may be used for the preparation of tungsten metal. Although not necessary to do so, I prefer to convert the crystals into heavy tungstic oxide by heating them in air, preferably on silica trays. The heavy tungstic oxide thus obtained contains up to one and one-half per cent of a residue which is non-volatile when the oxide is heated to about 500° C. in an atmosphere of hydrochloric acid gas and air. This non-volatile residue appears to be principally due to potassium oxide. If a much greater amount of potassium carbonate, such as 15 or 20% by weight of the crude tungstic oxide, is contained in the original solution the heavy oxide produced by firing the crystals obtained from the solution is decidedly whitish in color. This color is probably due to the high content of potassium as such oxide may contain as high as 5% to 9% of residue non-volatile in hydrochloric acid gas and air. In just what way the potassium is associated with the tungsten in the heavy tungstic oxide prepared in accordance with my invention is not known, but apparently it is different from the association that can be obtained by mechanically mixing potassium oxide or a salt of potassium with tungstic oxide, as the tungsten metal obtained by using the heavy oxide prepared in accordance with my invention exhibits characteristics and properties quite different from metal obtained by using tungstic oxide with which potassium salts have been mechanically mixed.

From the heavy oxide prepared in accordance with my invention and containing potassium or equivalent alkali metal associated with the tungsten, I may obtain in known ways tungsten which may then be wrought and drawn into filaments by the method disclosed in the Coolidge U. S. Patent 1,082,933, December 30, 1913. The tungsten metal is obtained from this heavy tungstic oxide made from crystals containing potassium and tungsten intimately associated, instead of from tungstic oxide precipitated from an alkaline tungstate solution by hydrochloric acid. The following method which has been used with precipitated tungstic oxide, may be used to advantage to obtain good filaments from heavy tungstic oxide prepared in accordance with my invention.

An alkaline silicate solution is prepared by fusing a mixture of about 1800 grams of hydrated potassium carbonate, 450 grams sodium nitrate and 550 grams of finely powdered silica and dissolving the fusion in ten liters of water. A tungstate is then prepared by mixing with 1500 grams of the heavy tungstic oxide containing potassium and prepared as above described, 500 grams of hydrated potassium carbonate, 300 grams sodium nitrate and 500 grams sodium carbonate and making this mixture into a paste with about 300 cubic centimeters of the alkaline silicate solution above referred to, with additional water, if necessary.

This paste is fused, then cooled and broken up into small pieces, and dissolved in hot water to produce a solution having specific gravity of 1.300. This solution in comparatively small amounts, such as 3½ liters, is brought to a boil and then poured into about an equal amount of hot dilute hydrochloric acid by means of a glass funnel having a jet with a diameter of about 4/100 of an inch. By this operation there is obtained a bright yellow precipitate of tungstic oxide containing both silica and potassium in some form and perhaps in combination with the tungsten. This oxide is washed on a filter until it does not show an acid reaction to litmus paper and is then dried.

The dried oxide is now reduced in an atmosphere of hydrogen to produce tungsten metal. This metal may be pressed up, sintered into slugs, and worked into wires but to obtain greater uniformity of product I prefer to mix about 1200 grams of this metal with about 1200 grams of the oxide from which the metal was reduced and reduce the mixture in hydrogen. By this procedure I obtain more uniform results and the metal, when made into slugs and worked into wire in accordance with disclosure of the Coolidge patent, shows to a very marked extent a resistance to change in form and to sagging even though operated at high temperatures in a gas filled lamp, and is also non-off-setting to a marked extent.

I may use the crystals obtained as above described for preparing wire by other methods. For example, I have obtained very good wire by adding to the solution of ammonium tungstate prepared from crude tungstic oxide solution containing enough potassium carbonate to equal from one-quarter of one per cent to one per cent by weight of the crude tungstic oxide. I obtain the best results by using about one-half of one per cent of potassium carbonate. The para ammonium potassium tungstate crystals obtained from the solution were ignited in air to convert them into heavy tungstic oxide which contained about one-quarter of one per cent of potassium. This heavy tungstic oxide was placed in a covered Battersea crucible of the usual type and fired in a gas furnace to 1200° C. for about three and one-half hours. This firing causes the oxide to take up additions, consisting largely of silica and alumina from the crucible. These additions should amount to about .8 to 1.5 per cent of the oxide by weight. The fired oxide was apparently fused, was quite dark in color, and consisted of a mass of brilliant crystals. These crystals were crushed, passed through a sieve of eighty meshes to the inch, and reduced in hydrogen to a gray metal which was then pressed, sintered, and worked into drawn tungsten wire which exhibited to a very marked extent resistance to sagging at high temperatures.

The additions to the oxide taken up from the Battersea crucible may also be made in other ways. For example, either the para ammonium potassium tungstate crystals or the heavy oxide obtained by firing them in air may be moistened with a solution containing up to eight-tenths per cent of alumina ($Al_2O_3$) and from one-tenth to one-half per cent of silica ($SiO_2$) as sodium silicate. I prefer to add about two-tenths per cent of alumina and about one-tenth per cent of silica. For example, to 1000 grams of para ammonium potassium tungstate crystals I add 13 grams aluminum nitrate in solution and 5 grams of sodium silicate solution containing 25% of silica. These solutions are well stirred, then evaporated to dryness, and the mixture thus obtained is reduced to metal by hydrogen. This metal may then be worked into wire in the usual way.

I do not wish to be restricted to any particular theory but it seems probable that the potassium or equivalent alkali metal when used in accordance with my invention, influences or affects in some way, the physical characteristics of the tungsten. It is known that tungstic oxide readily units with itself and forms complexes and possibly the potassium or the potassium salts facilitate formation of some desirable complexes. Wire prepared in accordance with my invention does not contain any more non-volatile content than wire prepared from the same crude oxide in the usual way which may indicate that the potassium exerts a physical rather than a chemical effect. Apparently the greater part of the potassium found in the oxide produced from the potassium ammonium para tungstate crystals disappear during the preparation of the metal from that oxide and the working of the metal into wire.

What I claim as new and desire to secure by Letters Patent of the United States, is,—

1. The step in the process of producing a tungsten filament substantially free from sagging and off-setting which consists in dissolving tungstic oxide in an alkaline solution containing potassium, obtaining from said solution crystals of a double salt containing potassium and tungsten, and using said crystals for the production of tungsten metal.

2. The step in the process of producing a tungsten filament substantially free from sagging and off-setting which consists in intimately associating in solution tungsten and two alkali metals, one of which is potassium, obtaining from said solution crystals comprising a double salt of said alkali metals and tungsten, and using said crystals for the preparation of tungsten metal.

3. The step in the process of producing a tungsten filament substantially free from sagging and off-setting which consists in producing a crystallized double salt of tungsten containing ammonium and potassium, heating said salt in air to convert it into tungstic oxide, and using said tungstic oxide for the preparation of tungsten metal.

4. The step in the process of producing a tungsten filament substantially free from sagging and off-setting which consists in obtaining crystals of potassium ammonium para tungstate containing from 0.25% to 10% of potassium, and using said crystals for the preparation of tungsten metal.

5. The method of preparing tungstic oxide for the preparation of tungsten metal resistant in the form of filaments to sagging and off-setting which consists in dissolving crude tungstic oxide in aqua-ammonia, adding a soluble salt of potassium, evaporating to obtain crystals containing ammonium, potassium, and tungsten, and heating said crystals in air to convert them into heavy tungstic oxide associated with potassium.

6. The method of preparing tungstic oxide for the preparation of tungsten metal resistant in the form of filaments to sagging and off-setting which consists in obtaining from crude tungstic oxide a solution containing ammonium, tungsten and 0.25% to 10% of potassium, evaporating said solution to obtain white flaky crystals of pearly lustre containing ammonium potassium and tungsten, and firing said crystals in air to convert them into heavy tungstic oxide associated with potassium.

In witness whereof, I have hereunto set my hand this 8th day of February, 1922.

HARRY M. FERNBERGER.